United States Patent
Kwon et al.

(10) Patent No.: US 8,489,818 B2
(45) Date of Patent: Jul. 16, 2013

(54) CORE CLUSTER, ENERGY SCALABLE VECTOR PROCESSING APPARATUS AND METHOD OF VECTOR PROCESSING INCLUDING THE SAME

(75) Inventors: Young Su Kwon, Daejeon (KR); Moo Kyoung Chung, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 329 days.

(21) Appl. No.: 12/841,605

(22) Filed: Jul. 22, 2010

(65) Prior Publication Data

US 2011/0099334 A1  Apr. 28, 2011

(30) Foreign Application Priority Data

Oct. 27, 2009  (KR) .................. 10-2009-0102241

(51) Int. Cl.
*G06F 12/00* (2006.01)
*G06F 13/00* (2006.01)

(52) U.S. Cl.
USPC ........... 711/130; 711/113; 711/118; 711/141; 711/147; 711/154; 711/170

(58) Field of Classification Search
USPC ................. 711/113, 118, 130, 141, 147, 154, 711/170
See application file for complete search history.

(56) References Cited

U.S. PATENT DOCUMENTS

| | | | |
|---|---|---|---|
| 7,174,469 B2 | 2/2007 | Luick | |
| 7,260,106 B2 | 8/2007 | Yavatkar et al. | |
| 7,318,164 B2 | 1/2008 | Rawson, III | |
| 2007/0226423 A1* | 9/2007 | Arimilli et al. | 711/141 |
| 2008/0209243 A1 | 8/2008 | Ghiasi et al. | |
| 2010/0235580 A1* | 9/2010 | Bouvier | 711/129 |

OTHER PUBLICATIONS

Zhai, Bo et al. Energy efficient near-threshold chip multi-processing, IN: the 2007 international symposium on Lowe power electronics and design, ACM, pp. 32-37 (2007).

* cited by examiner

*Primary Examiner* — Midys Rojas
(74) *Attorney, Agent, or Firm* — Rabin & Berdo, P.C.

(57) ABSTRACT

A core cluster includes a cache memory, a core, and a cluster cache controller. The cache memory stores and provides instructions and data. The core accesses the cache memory or a cache memory provided in an adjacent core cluster, and performs an operation. The cluster cache controller allows the core to access the cache memory when the core requests memory access. The cluster cache controller allows the core to access the cache memory provided in the adjacent core cluster when the core requests a clustering to the adjacent core cluster. The cluster cache controller allows a core provided in the adjacent core cluster to access the cache memory when the core receives a clustering request from the adjacent core cluster.

13 Claims, 3 Drawing Sheets

CORE CLUSTER, ENERGY SCALABLE VECTOR PROCESSING APPARATUS AND METHOD OF VECTOR PROCESSING INCLUDING THE SAME

CROSS-REFERENCE TO RELATED APPLICATIONS

This application claims the priority of Korean Patent Application No. 10-2009-102241 filed on Oct. 27, 2009, in the Korean Intellectual Property Office, the disclosure of which is incorporated herein by reference.

BACKGROUND OF THE INVENTION

1. Field of the Invention

The present invention relates to a core cluster having a parallel core processor structure, which is capable of flexibly controlling computing capacity and energy consumption according to the requirements of vast applications, and an energy scalable vector processing apparatus and a method of vector processing including the core cluster.

2. Description of the Related Art

Processors refer to hardware or IP which executes an algorithm for a specific application by reading instructions from a storage such as a memory or a disk, performing a specific operation on an operand according to operations encoded in the instructions, and storing the operation results.

Processors are widely applied within the field of system semiconductors. Processors have been applied to high-performance media data processing for high-capacity multimedia data, e.g., video data compression and decompression, audio data compression and decompression, audio data conversion and sound effects, etc., intermediate-performance data processing for wired/wireless communication modems, voice codec algorithms, and network data processing, minimum-performance microcontroller platforms such as a touch screen, a household controller, and a motor control, as well as devices such as a wireless sensor network or a ultra-small sized electronic dust to which the application of a stable power supply or an external power supply is impossible. As such, the application range of processors has been widened to a variety of fields.

Conventionally, dedicated processors have been applied, depending on the required performance of applications. A processor having a high operating frequency and requiring a wide hardware area has been used in applications requiring high performance, and a processor having a low frequency but capable of energy efficiency in a small hardware area has been used to applications requiring low performance.

In recent years, however, as the complexity of applications has increased, whole products have been constituted with subsystems adopting various processor platforms.

As one example, a digital video recording (DVR) product is constituted with a variety of subsystems, such as a processor and dedicated hardware based subsystem for video encoding and decoding, a subsystem for external network operation, a microcontroller subsystem for system replication, and so on.

In constituting integrated systems, the use of various processors in the product constituted with a plurality of subsystems acts as a factor to degrade interoperability between platforms constituted with dual processors.

Code differences between processors make it impossible to commonly operate a flash memory or the like and to reuse data and code between processors, leading to an increase in system configuration costs.

The use of common processor platforms meeting the requirements of vast application systems will reduce system configuration costs, increase interoperability between processor platforms, reduce a development period, and control dynamic computing capacity and energy consumption according to system operation conditions.

SUMMARY OF THE INVENTION

An aspect of the present invention provides an energy scalable vector processing apparatus and a method of vector processing including a core cluster which has a parallel core processor structure, capable of flexibly controlling computing capacity and energy consumption according to requirements of vast applications.

According to an aspect of the present invention, there is provided a core cluster including: a cache memory storing and providing instructions and data; a core accessing the cache memory or a cache memory provided in an adjacent core cluster, and performing an operation; and a cluster cache controller allowing the core to access the cache memory when the core requests memory access; allowing the core to access the cache memory provided in the adjacent core cluster when the core requests a clustering operation to the adjacent core cluster; and allowing a core provided in the adjacent core cluster to access the cache memory when the core receives a clustering operation request from the adjacent core cluster.

According to another aspect of the present invention, there is provided an energy scalable vector processing apparatus including: a plurality of core clusters clustered with adjacent core clusters so that the clustered core clusters share a single cache memory, wherein each of the core clusters includes: a cache memory storing and providing instructions and data; a core accessing the cache memory or a cache memory provided in an adjacent core cluster, and performing an operation; and a cluster cache controller allowing the core to access the cache memory when the core requests memory access; allowing the core to access the cache memory provided in the adjacent core cluster when the core requests a clustering operation to the adjacent core cluster; and allowing a core provided in the adjacent core cluster to access the cache memory when the core receives a clustering operation request from the adjacent core cluster.

The number of the core clusters may be adjustable according to computing capacity of the vector processing apparatus.

According to another aspect of the present invention, there is provided an energy scalable vector processing method including a plurality of core clusters, including: selecting adjacent core clusters to be clustered among the plurality of core clusters; and allowing the adjacent core clusters to share the cache memory.

The allowing of the adjacent core clusters to share the cache memory may include: allowing one of the adjacent core clusters to request a clustering operation to the remaining core clusters; allowing the core cluster requesting the clustering operation to stop the use of a cache memory provided in the corresponding core cluster; and allowing the core cluster receiving the clustering operation request to permit the core cluster requesting the clustering operation to access a cache memory provided in the core cluster receiving the clustering operation request.

The energy scalable vector processing method may further include: allowing the core cluster requesting the clustering operation to interrupt the supply of an operating voltage and frequency to the cache memory provided in the corresponding core cluster.

The allowing of the adjacent core clusters to share the cache memory may further include: allowing the core cluster receiving the clustering operation request to preferentially connect the core and the cache memory provided in the corresponding core cluster when the core provided in the core cluster receiving the clustering operation request requests memory access.

BRIEF DESCRIPTION OF THE DRAWINGS

The above and other aspects, features and advantages of the present invention will be more clearly understood from the following detailed description taken in conjunction with the accompanying drawings, in which.

DETAILED DESCRIPTION OF THE PREFERRED EMBODIMENT

Figure 1:
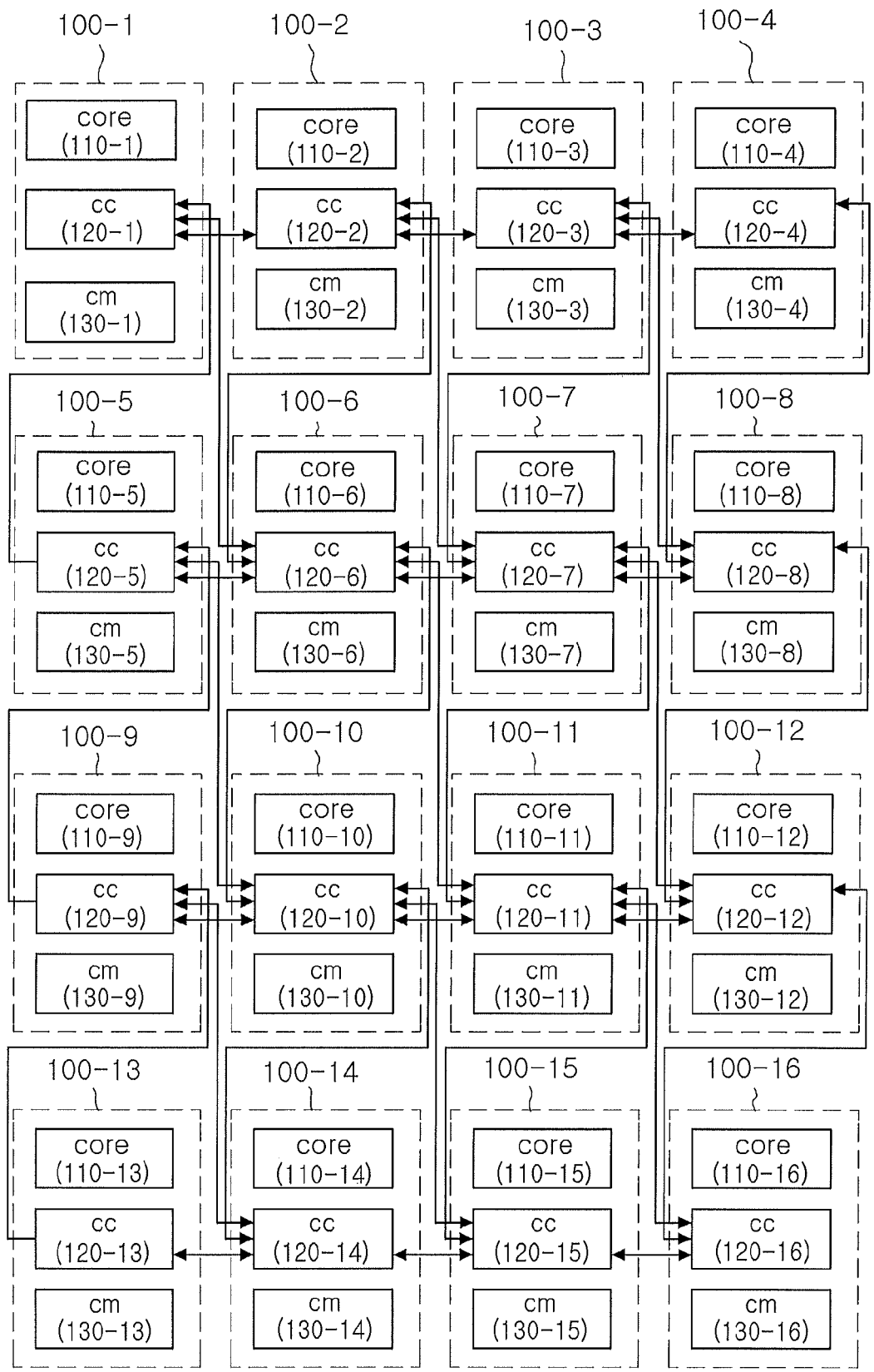
FIG. 1 is a configuration diagram of an energy scalable vector processing apparatus including a core cluster according to an embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

It will be understood that when an element is referred to as being "connected to" another element, it can be directly connected to the other element or intervening elements may also be present. In contrast, when an element is referred to as being "directly connected to" another element, there are no intervening elements present. In addition, unless explicitly described to the contrary, the word "comprise" and variations such as "comprises" or "comprising," as well as the word "include" and variations such as "includes" and "including," will be understood to imply the inclusion of stated elements but not the exclusion of any other elements.

FIG. 1 is a configuration diagram of an energy scalable vector processing apparatus including a core cluster according to an embodiment of the present invention.

Referring to FIG. 1, an energy scalable vector processing apparatus and method include a plurality of core clusters 100-1 to 100-6. Each core cluster (e.g., 100-6) includes a core 110-6, a clustering cache controller (cc) 120-6, and a cache memory (cm) 130-6.

Generally, each core cluster (e.g., 100-6) performs an operation by using its cache memory 130-6. However, when the core 110-6 requests a clustering operation, the core cluster 100-6 accesses the cache memories 130-1, 130-2, 130-5, 130-7, 130-10 and 130-11 provided in the adjacent core clusters 100-1, 100-2, 100-5, 100-7, 100-10 and 100-11, and performs an operation. On the other hand, when the core 110-6 receives a clustering operation request from the adjacent core clusters 100-1, 100-2, 100-5, 100-7, 100-10 and 100-11, the cores 110-1, 110-2, 110-5, 110-7, 110-10 and 110-11 provided in the adjacent core clusters 100-1, 100-2, 100-5, 100-7, 100-10 and 100-11 requesting the clustering operation are allowed to access the cache memory 130-6 provided in the core cluster 100-6.

In this case, the adjacent core clusters may be the core clusters 100-1, 100-2, 100-5, 100-7, 100-10 and 100-11 located at the upper left side, upper side, left side, right side, lower side, and lower right side with respect to the reference core cluster 100-6. Some of them may request a clustering operation to the core cluster 100-6, and the others may receive a clustering operation request from the core cluster 100-6.

For example, the core clusters 100-1, 100-2 and 100-5 located at the upper left side, upper side, and left side may request the clustering operation to the core cluster 100-6, and the core clusters 100-7, 100-10 and 100-11 located at the right side, lower side, and lower right side may receive a clustering operation request from the core cluster 100-6.

Generally, in the case of a processor constituted with a core and a memory, most energy consumption occurs in the memory. According to the embodiment of the present invention, the energy consumption of the vector processing apparatus and the vector processing method is flexibly controlled by adjusting the number of cache memories to be enabled by the clustering operation.

In addition, the plurality of core clusters 100-1 to 100-16 have a regular structure and may adjust the number of the core clusters 100-1 to 100-16 according to necessary computing capacity. Specifically, computing capacity may be increased by increasing the number of the core clusters 100-1 to 100-16, or the computing capacity may be reduced by decreasing the number of the core clusters 100-1 to 100-16.

The functions of the respective elements will be described below with reference to FIG. 1.

The core 110-6 is a processor core which has an instruction set architecture, and performs an operation based on instructions and data stored in the cache memory 130-6. Meanwhile, the core 110-6 may request the clustering with the adjacent core clusters 100-7, 10-10 and 100-11 and perform an operation by using instructions and data stored in the external cache memories 130-7, 130-10 and 130-11 provided in the adjacent core clusters 100-7, 100-10 and 100-11.

When the core 110-6 requests memory access, the cluster cache controller 120-6 connects the core 110-6 to the cache memory 130-6. When the core 10-6 receives a clustering operation request from the adjacent core clusters 100-1, 10-2 and 100-5, the cluster cache controller 120-6 connects the cache memory 130-6 to the external cores 110-1, 110-2 and 110-5 provided in the adjacent core clusters 100-1, 10-2 and 100-5. In addition, when the core 110-6 requests clustering with the adjacent core clusters 100-7, 100-10 and 100-11, the core 110-6 is connected to the external cache memories 130-7, 130-10 and 130-11 provided in the adjacent core clusters 100-7, 100-10 and 100-11.

The cache memory 130-6 is a memory which caches instructions and data. The cache memory 130-6 is implemented with a dual port cache memory and minimizes performance degradation caused by the clustering operation. Specifically, since the two clustered cores are accessed through different ports, amiss ratio of the cache memory is minimized, even though the two cores are accessed at the same time.

Figure 2:
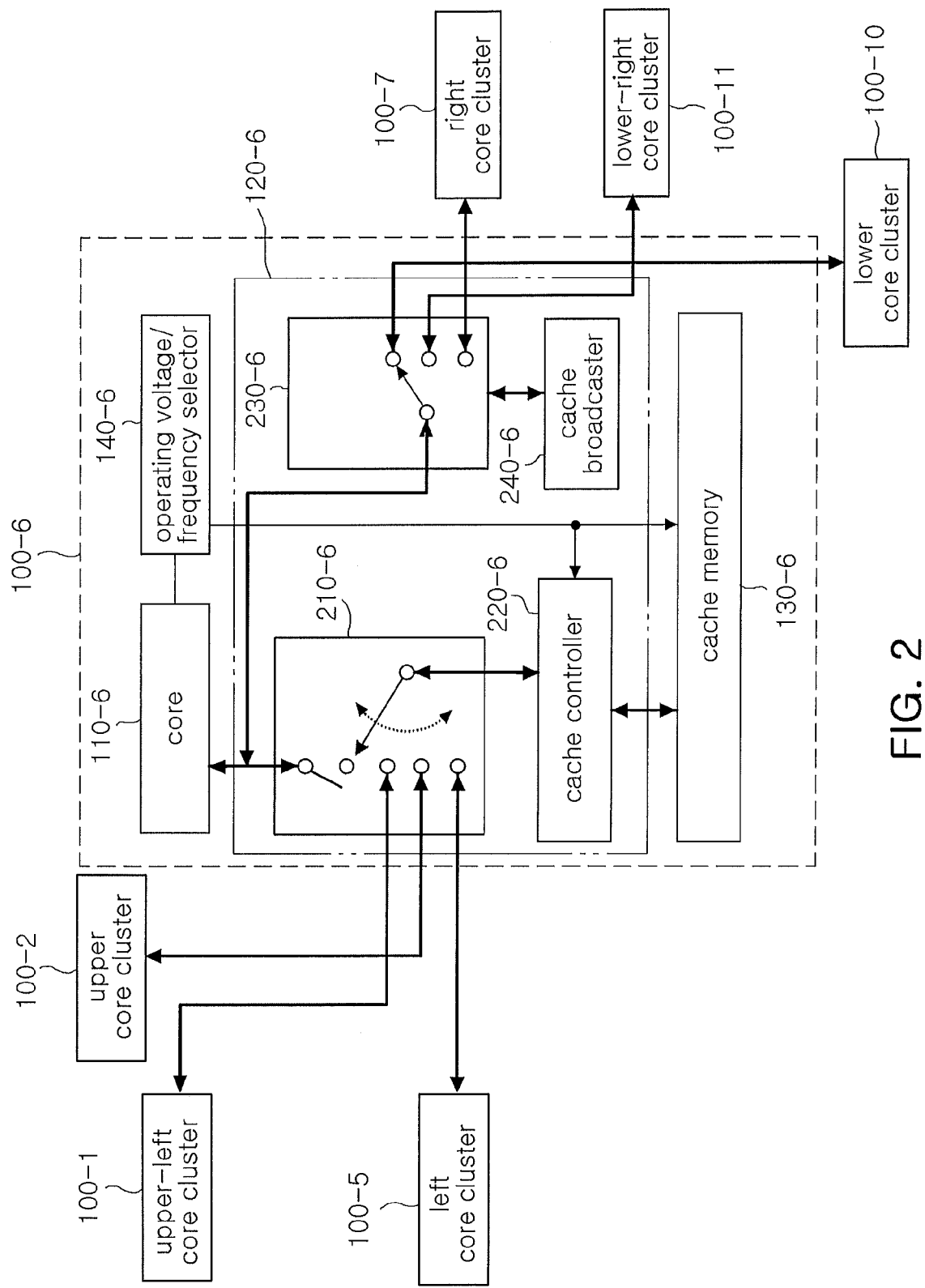
FIG. 2 is a detailed configuration diagram of a cluster cache controller according to an embodiment of the present invention.

FIG. 2 is a detailed configuration diagram of a cluster cache controller according to an embodiment of the present invention.

Referring to FIG. 2, a cluster cache controller (e.g., 120-6) according to an embodiment of the present invention includes a cache access arbitrator 210-6, a cache controller 220-6, an adjacent cache selector 230-6, and a cache broadcaster 240-6.

When the internal core 110-6 requests memory access, the cache access arbitrator 210-6 allows the core 110-6 to access the cache memory 130-6. When the internal core 110-6 receives a clustering operation request from the adjacent core clusters 100-1, 10-2 and 100-5, the cache access arbitrator 210-6 allows the external cores 110-1, 110-2 and 110-5 of the adjacent core clusters 100-1, 100-2 and 100-5 to access the cache memory 130-6. That is, the internal core 110-6 and the external cores 110-1, 110-2 and 110-5 requesting the clustering operation share the single cache memory 130-6.

To this end, the cache access arbitrator 210-6 includes switching nodes connected to the internal core 110-6 and the external cores 110-1, 110-2 and 110-5, and a switching node connected to the cache controller 220-6. When the internal core 110-6 requests memory access, the cache access arbitrator 210-6 connects the switching node which is connected to the core 110-6 and the switching node which is connected to the cache controller 220-6. When the internal core 110-6 receives a clustering request from a specific external core (e.g., 110-1), the cache access arbitrator 210-6 connects the switching node which is connected to the corresponding adjacent core 110-1 and the switching node which is connected to the cache controller 220-6.

When memory access request from the internal core 110-6 and a clustering request from the external cores 110-1, 110-2 and 110-5 occur at the same time, the cache access arbitrator 210-6 preferentially connects the internal core 110-6 to the cache controller 220-6. That is, the memory access request from the internal core 110-6 is preferentially processed.

When the internal core 110-6 requests clustering to the adjacent core clusters 100-7, 100-10 and 100-11, the adjacent cache selector 230-6 connects the internal core 110-6 to the external cache access arbitrators 210-7, 210-10 and 210-11 provided in the adjacent core clusters 100-7, 100-10 and 100-12. In this manner, the internal core 110-6 accesses the external cache memories 130-7, 130-10 and 130-11 through the cache access arbitrators 210-7, 210-10 and 210-11 and the cache controllers 220-7, 220-10 and 220-11 provided in the adjacent core clusters 100-7, 100-10 and 100-11. Through these procedures, the desired operation is performed.

To this end, the adjacent cache selector 230-6 includes a switching node connected to the core 110-6, and switching nodes connected to the external cache access arbitrators 210-7, 210-10 and 210-11. When the core 110-6 requests clustering to a specific adjacent core cluster (e.g., 100-7), the adjacent cache selector 230-6 connects the switching node which is connected to the core 110-6 and the switching node which is connected to the external cache access arbitrator 210-7 provided in the specific adjacent core cluster 100-7.

The cache controller 220-6 allows the internal core 110-6 or the external cores 110-1, 110-2 and 110-5 to access the cache memory 130-6 in order that the internal core 110-6 or the external cores 110-1, 110-2 and 110-5 may use instructions and data stored in the cache memory 130-6.

When the core 110-6 requests a clustering operation, the cache broadcaster 240-6 acquires information on a changed cache memory line by analyzing the access state of the cache controller 220-6, and broadcasts the acquired information to the adjacent core clusters 100-1, 100-2, 100-5, 100-7, 100-10 and 100-10, thereby maintaining cache coherence.

As the cluster cache controller is configured as above, the number of cache memories to be enabled may be adjusted, and thus, energy consumption may be adjusted.

However, the core cluster 100-6 according to the embodiment of the present invention may further include an operation voltage/frequency selector 140-6 in order to further reduce energy consumption more effectively.

The operating voltage/frequency selector 140-6 supplies an operating voltage and frequency, and supplies an operating voltage and frequency to the cache controller 220-6 and the cache memory 130-6, or interrupts the supply of the operating voltage and frequency to the cache controller 220-6 and the cache memory 130-6, depending on an operating state of the core cluster 100-6.

Specifically, when the core 110-6 requests a clustering with the adjacent core clusters 100-7 100-10 and 100-11 and thus the cache memory 130-6 is not used, the operating voltage/frequency selector 140-6 interrupts the supply of the operating voltage and frequency to the cache controller 220-6 and the cache memory 130-6. If not, the operating voltage/frequency selector 140-6 normally supplies the operating voltage and frequency to the cache controller 220-6 and the cache memory 130-6.

Figure 3:
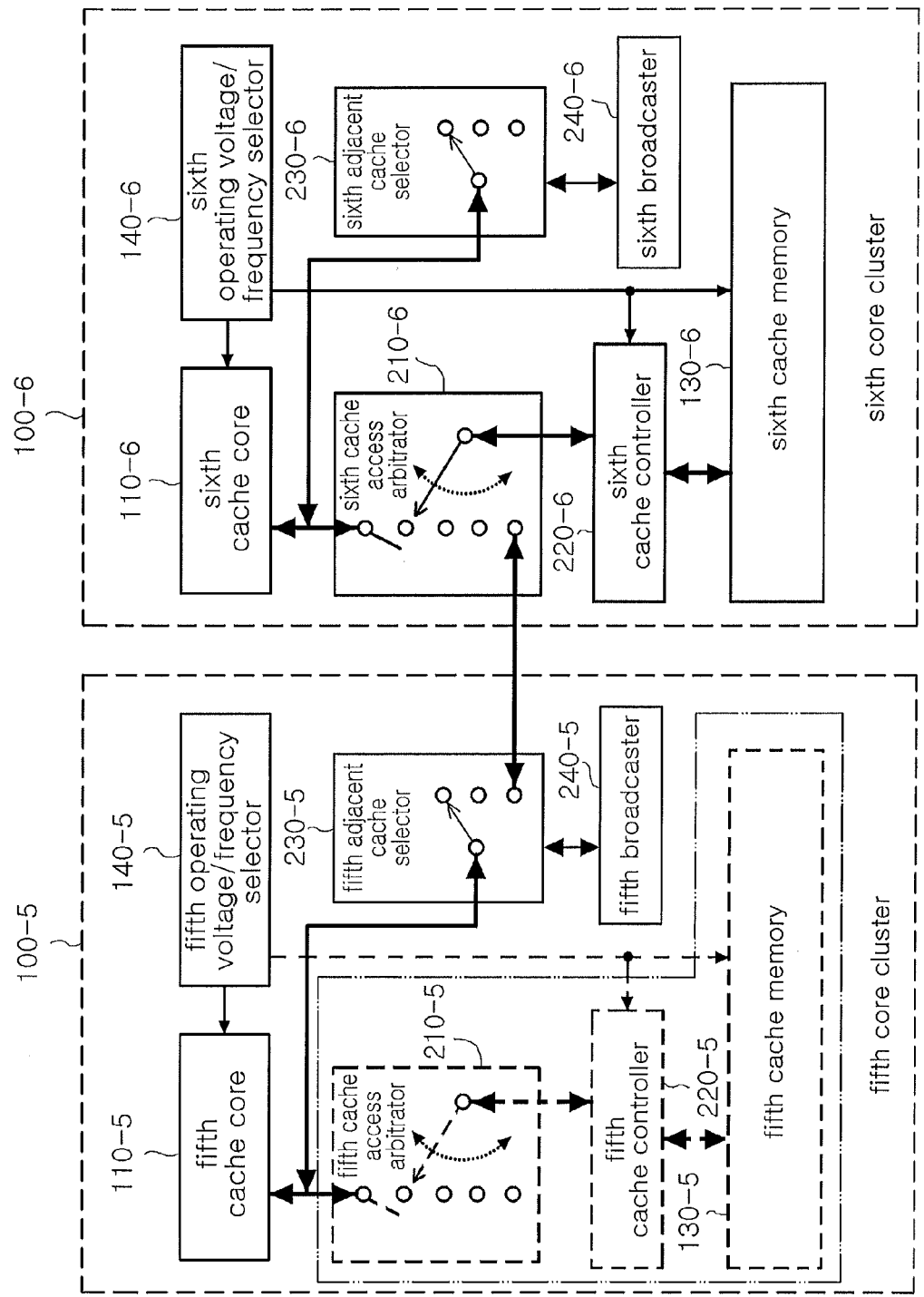
FIG. 3 illustrates a clustering method of the vector processing apparatus according to an embodiment of the present invention.

FIG. 3 illustrates a clustering method of the vector processing apparatus according to an embodiment of the present invention.

Referring to FIG. 3, the core cluster to be clustered among the plurality of core clusters is selected. For convenience, it is assumed that the fifth core cluster 100-5 and the sixth core cluster 100-6 perform clustering, the fifth core cluster 100-5 requests a clustering operation, and the sixth core cluster 100-6 responds to a clustering request.

When the fifth core cluster 100-5 requests clustering to the sixth core cluster 100-6, the fifth cache access arbitrator 210-5 interrupts a connection between the fifth cache core 110-5 and the fifth controller 220-5 in order for the fifth cache core 110-5 not to use the fifth cache memory 130-5.

The fifth operating voltage/frequency selector 140-5 interrupts the supply of the operating voltage and frequency to the fifth cache controller 220-5 and the fifth cache memory 130-5.

The fifth adjacent cache selector 230-5 responds to the clustering request from the fifth core cluster 100-5 to connect the fifth cache core 110-5 and the fifth cache access arbitrator 210-6.

Then, the sixth cache access arbitrator 210-6 performs a switching operation according to the clustering request from the fifth core cluster 100-5 and the memory access request from the sixth cache core 110-6, and allows the fifth cache core 110-5 and the sixth cache core 110-6 to access the sixth cache memory 130-6.

As such, the clustering method of the vector processing apparatus according to the embodiment of the present invention allows the adjacent core clusters 100-5 and 100-6 to share the single cache memory 130-6. Consequently, the number of cache memories to be enabled may be reduced from one to two.

In addition, although the case in which two core clusters are clustered has been described above, the plurality of core clusters perform the clustering in multiple stages in the practical application, thereby adjusting energy consumed in the overall vector processing apparatus in multiple stages.

As set forth above, according to exemplary embodiments of the invention, the plurality of core clusters provided in the vector processing apparatus perform clustering with the adjacent core clusters and thus share the cache memory, thereby adjusting the amount of energy consumed in the overall vector processing apparatus in multiple stages.

Furthermore, since the number of core clusters provided in the vector processing apparatus may be adjusted, the computing capacity of the vector processing apparatus may be freely adjusted.

While the present invention has been shown and described in connection with the exemplary embodiments, it will be apparent to those skilled in the art that modifications and variations can be made without departing from the spirit and scope of the invention as defined by the appended claims.

What is claimed is:

1. A core cluster comprising:
   a cache memory configured to store and provide instructions and data;
   a core configured to access the cache memory or a cache memory provided in an adjacent core cluster, and to perform an operation; and
   a cluster cache controller configured to
     allow the core to access the cache memory when the core requests memory access,
     allow the core to access the cache memory provided in the adjacent core cluster when the core requests clustering to the adjacent core cluster, and
     allow a core provided in the adjacent core cluster to access the cache memory when the core receives a clustering request from the adjacent core cluster.

2. The core cluster of claim 1, wherein the cluster cache controller comprises:
   a cache access arbitrator configured to allow the core to access the cache memory when the core requests the memory access, and to allow the core provided in the adjacent core cluster to access the cache memory when the core receives the clustering request from the adjacent core cluster; and
   an adjacent cache selector configured to allow the core to access the cache memory provided in the adjacent core cluster when the core requests clustering to the adjacent core cluster.

3. The core cluster of claim 2, wherein the cache access arbitrator is configured to preferentially connect the core and the cache memory when the memory access request from the core and the clustering request from the adjacent core cluster occur at the same time.

4. The core cluster of claim 2, wherein the cache access arbitrator is configured to receive the clustering request from a core cluster located at an upper left side, upper side, or left side of the core cluster, and to allow a core provided in the core cluster located at the upper left side, upper side, or left side of the core cluster to access the cache memory.

5. The core cluster of claim 2, wherein the adjacent cache selector is configured to request clustering to a core cluster located at an upper left side, upper side, or left side of the core cluster, and to allow the core to access cache memory provided in a core cluster located at a right side, lower side, or lower right side of the core cluster.

6. The core cluster of claim 2, wherein the cluster cache controller comprises:
   a cache controller configured to allow the core or the core provided in the adjacent core cluster to access the cache memory to use the instructions and data stored in the cache memory; and
   a cache broadcaster configured to broadcast an access state of the cache controller to the adjacent core cluster and to maintain cache coherence.

7. The core cluster of claim 6, further comprising an operating voltage/frequency selector configured to interrupt a supply of an operating voltage and frequency to the cache access arbitrator and the cache memory when the core requests the clustering to the adjacent core cluster.

8. The core cluster of claim 2, the cache access arbitrator including a cache controller and switching nodes, the switching nodes configured to be connected to the cache controller and to respective ones of adjacent core clusters in response to a clustering request from one or more of the respective ones of adjacent core clusters.

9. An energy scalable vector processing apparatus comprising:
   a plurality of core clusters each clustered with adjacent core clusters to share respective cache memories, wherein each of the core clusters comprises:
     a cache memory configured to store and provide instructions and data;
     a core configured to access the cache memory or a cache memory provided in an adjacent core cluster, and to perform an operation; and
     a cluster cache controller configured to
     allow the core to access the cache memory when the core requests memory access,
     allow the core to access the cache memory provided in the adjacent core cluster when the core requests a clustering to the adjacent core cluster, and
     allow a core provided in the adjacent core cluster to access the cache memory when the core receives a clustering request from the adjacent core cluster.

10. The energy scalable vector processing apparatus of claim 8, wherein the number of the core clusters is adjustable according to computing capacity of the vector processing apparatus.

11. An energy scalable vector processing method, comprising:
    selecting adjacent core clusters to be clustered among a plurality of core clusters;
    allowing the adjacent core clusters to share a cache memory;
    wherein the allowing of the adjacent core clusters to share the cache memory comprises:
    allowing one of the adjacent core clusters to request access to a cache memory of another one of the adjacent core clusters;
    allowing the one of the adjacent core clusters requesting the access to stop the use of a cache memory provided in the requesting one of the adjacent core clusters; and
    allowing the other one of the adjacent core clusters to permit the access.

12. The energy scalable vector processing method of claim 11, further comprising: allowing the one of the adjacent core clusters requesting the access to interrupt a supply of an operating voltage and frequency to the cache memory provided in the requesting one of the adjacent core clusters.

13. The energy scalable vector processing method of claim 11, claim wherein the allowing of the adjacent core clusters to share the cache memory further comprises: allowing the other one of the adjacent core clusters to preferentially connect a core and a cache memory provided in the other one of the adjacent core clusters when the core provided in the other one of the adjacent core clusters requests memory access.

* * * * *